Patented Mar. 16, 1954

2,672,460

UNITED STATES PATENT OFFICE 2,672,460

DISUBSTITUTED PIPERAZINES AND METHODS OF PREPARING THE SAME

Edward A. Conroy, Plainfield, N. J., assignor to American Cyanamid Company, New York, N. Y., a corporation of Maine No Drawing. Application June 24, 1952,
Serial No. 295,360

16 Claims. (Cl. 260—256.4)

This invention relates to new 1,4-disubstituted piperazines. More particularly, it relates to 1-heterocyclic-4-imidoacylpiperazines and acid addition salts thereof and to methods of preparing the same.

In the past numerous 1,4-disubstituted piperazines have been described. Kermack and Smith, Journal of the Chemical Society, 1931, 3096–3104 described the preparation of compounds such as phthalimidoethyl piperazine. This compound, however, differs markedly from the compounds of the present invention both in structure and utility.

The compounds of the present invention may be illustrated by the following general formula:

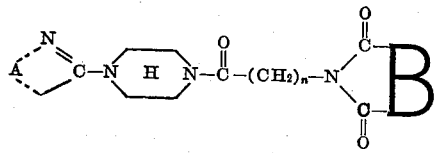

in which A represents atoms selected from the group consisting of carbon, nitrogen and sulfur, the heteroatoms being in the minority, required to form a heterocyclic ring with the

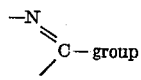

B is a vicinal bivalent hydrocarbon radical having 2 to 10 carbon atoms and $n$ is an integer from 1 to 3; and acid addition salts thereof.

The compounds of the present invention are, in general, high melting solids. Generally speaking, the free bases are virtually insoluble in water or petroleum ether but somewhat more soluble in lower aliphatic alcohols, chloroform and the like. These compounds are weakly basic and will form acid addition salts, particularly with strong mineral acids such as hydrochloric acid, sulfuric acid, and the like. The acid addition salts are essentially insoluble in organic solvents such as lower aliphatic alcohols, benzene, and the like, but they are moderately soluble in water or dilute aqueous acid solutions.

It is preferred to prepare the new compounds of the present invention by the reaction of a 1-heterocyclic piperazine with an imidoacyl halide in an inert solvent. It is usually desirable to have present an acid accepting agent. In general, the process may be graphically illustrated as follows:

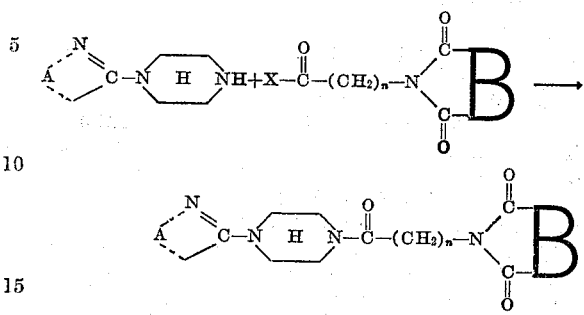

in which A, B and $n$ are as hereinbefore defined.

In carrying out the reaction of the present invention a solution of the imidoacyl halide is added portionwise to a stirred solution of the appropriate 1-heterocyclic piperazine and an acid accepting agent while cooling the reaction mixture preferably below 10° C. The reaction may, however, be carried out within the range of 5° C. to 80° C. if desired. The solvent may be an organic solvent such as diethyl ether, dioxane, benzene, xylene, toluene, or similar hydrocarbon solvent. Water may also be used, although the results obtained are not as good. The acid accepting agent may be compounds such as alkali metal carbonates, magnesium oxide, pyridine, triethylamine or other tertiary alkylamines, etc. After the addition is completed, the mixture is stirred at room temperature until the reaction appears to be complete. The product is recovered by filtration and usually contains water soluble impurities which are removed by washing with water. The 1-heterocyclic-4-imidoacylpiperazine thus obtained may be further purified by recrystallization from an organic solvent such as lower aliphatic alcohols, chlorobenzene, and the like. While the acid addition salts may be prepared in anhydrous solvents, such as lower aliphatic alcohols, some of them are readily formed in aqueous solution and may be purified by recrystallization from water or aqueous acid solution.

The compounds of the present invention may also be prepared by reacting a 1-heterocyclic-4-haloacylpiperazine with an alkali metal salt of the appropriate imide in an inert solvent such as chlorobenzene.

The compounds of the present invention are active pharmaceutical products possessing analgesic activity. These compounds, in general, show analgesic activity in animal tests and also when tested clinically.

The preparation of compounds illustrating the present invention are more fully shown in the following examples which are given by way of illustration only and not by way of limitation. All parts are by weight unless otherwise indicated.

EXAMPLE 1

*1-(2-pyridyl)-4-phthalimidoacetylpiperazine*

In a solution of 60.0 parts of 1-(2-pyridyl)-4-chloroacetylpiperazine in 500 parts of chlorobenzene is suspended 46.3 parts of potassium phthalimide. The reaction mixture is refluxed for six hours and filtered while at the boil. The product, which separates from the filtrate as a light yellow solid upon cooling, is removed by filtration and crystallized from absolute ethanol. The product, 1-(2-pyridyl)-4-phthalimidoacetylpiperazine, melts at 206.5°–207.5° C.

EXAMPLE 2

*1-(2-pyridyl)-4-phthalimidoacetylpiperazine*

In 450 parts of benzene is dissolved 40.8 parts of 1-(2-pyridyl) piperazine and 35.4 parts of triethylamine. The temperature of the solution is kept below 10° C., with stirring, while a solution of 55.9 parts of phthalimidoacetyl chloride in 220 parts of benzene is added portionwise over a period of thirty minutes. Then the reaction mixture is stirred for one hour at 25°–30° C. and filtered. The filtered cake is slurried with water, the product is removed by filtration and crystallized first from chlorobenzene and then from absolute ethanol. The product, 1-(2-pyridyl)-4-phthalimidoacetylpiperazine, melts at 205.0°–207.0° C.

EXAMPLE 3

*1-(2-thiazolyl)-4-phthalimidoacetylpiperazine*

In 450 parts of benzene is dissolved 42.3 parts of 1-(2-thiazolyl) piperazine and 35.4 parts of triethylamine. The temperature of the solution is kept below 10° C., with stirring, while a solution of 55.9 parts of phthalimidoacetyl chloride in 220 parts of benzene is added portionwise over a period of thirty minutes. Then the reaction mixture is stirred for one hour at 25°–30° C. and filtered. The filter cake is slurried with water, the product is removed by filtration and crystallized first from chlorobenzene and then from absolute ethanol. The product, 1-(2-thiazolyl)-4-phthalimidoacetylpiperazine, melts at 209.0°–209.5° C.

EXAMPLE 4

*1-(2-pyrimidyl)-4-phthalimidoacetylpiperazine*

In 650 parts of benzene is dissolved 41.0 parts of 1-(2-pyrimidyl) piperazine and 30.4 parts of triethylamine. The temperature of the solution is kept below 10° C., with stirring, while a solution of 55.9 parts of phthalimidoacetyl chloride in 200 parts of benzene is added portionwise over a period of thirty minutes. Then the reaction mixture is stirred for one hour at 25°–30° C. and filtered. The filter cake is slurried with water, the product is removed by filtration and crystallized first from chlorobenzene and then from absolute ethanol. The product, 1-(2-pyrimidyl)-4-phthalimidoacetylpiperazine, melts at 257.0°–259.0° C.

EXAMPLE 5

*1-(2-pyridyl)-4-(β-phthalimidopropionyl)-piperazine*

In 650 parts of benzene is dissolved 40.8 parts of 1-(2-pyridyl) piperazine and 30.4 parts of triethylamine. The temperature of the solution is kept below 10° C., with stirring, while a solution of 59.4 parts of the beta-phthalimidopropionyl chloride in 220 parts of benzene is added portionwise over a period of thirty minutes. Then the reaction mixture is stirred for one hour at 25°–30° C. and filtered. The filter cake is slurried with water, the product is removed by filtration and crystallized first from absolute ethanol and then from acetone. The product, 1-(2-pyridyl)-4-(beta-phthalimidopropionyl)-piperazine, melts at 166.0°–167.0° C.

EXAMPLE 6

*1-(2-pyridyl)-4-succinimidoacetylpiperazine*

In 570 parts of benzene is dissolved 40.8 parts of 1-(2-pyridyl) piperazine and 30.4 parts of triethylamine. The temperature of the solution is kept below 10° C., with stirring, while a solution of 43.9 parts of succinimidoacetyl chloride in 175 parts of benzene is added portionwise over a period of thirty minutes. Then the reaction mixture is stirred for one hour at 25°–30° C. and filtered. The filter cake is slurried with water and the product is removed with the aid of chloroform. The chloroform is removed from the extract by distillation and the residue, 1-(2-pyridyl)-4-succinimidoacetylpiperazine, when crystallized from absolute ethanol, melts at 180.0°–181.0° C.

EXAMPLE 7

*1-(2-pyridyl)-4-(4-cyclohexene-1,2-dicarboximidoacetyl)piperazine*

In 880 parts of benzene is dissolved 48.9 parts of 1-(2-pyridyl) piperazine and 40.5 parts of triethylamine. The temperature of the solution is kept below 10° C., with stirring, while a solution of 68.3 parts of 4-cyclohexene-1,2-dicarboximidoacetyl chloride in 250 parts of benzene is added portionwise over a period of thirty minutes. Then the reaction mixture is stirred for one hour at 25°–30° C. and filtered. The solvent is removed from the filtrate by distillation and the residual product, 1-(2-pyridyl)-4-(4-cyclohexene-1,2-dicarboximidoacetyl) piperazine, when crystallized from absolute ethanol, melts at 161.0°–162.5° C.

EXAMPLE 8

*1-(2-pyridyl)-4-phthalimidoacetylpiperazine hydrochloride*

In a solution of 75 parts of water and 12 parts of 36% aqueous hydrochloric acid at 65° C. is dissolved 10 parts of 1-(2-pyridyl)-4-phthalimidoacetylpiperazine. The solution, on cooling, deposits white crystals of 1-(2-pyridyl)-4-phthalimidoacetylpiperazine hydrochloride which melts at 257.5°–259.0° C.

I claim:

1. Compounds of the group consisting of those having the formula:

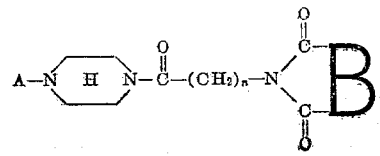

in which A is a member of the group consisting of pyridyl, thiazolyl and pyrimidyl radicals, B is a vicinal bivalent hydrocarbon radical having 2 to 6 carbon atoms and $n$ is a whole integer less than 3; and acid addition salts thereof.

2. Compounds having the formula:

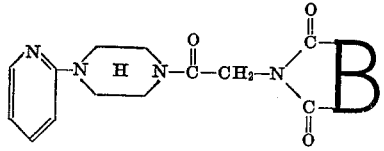

in which B is a vicinal bivalent hydrocarbon radical having 2 to 6 carbon atoms.

3. Compounds having the formula:

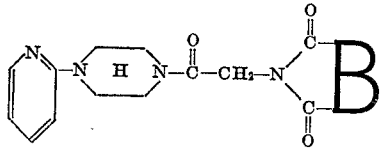

in which B is an ortho-phenylene radical.

4. 1 - (2 - pyridyl) - 4 - phthalimidoacetyl-piperazine.

5. 1 - (2 -thiazolyl) - 4 - phthalimidoacetyl-piperazine.

6. 1 - (2 - pyrimidyl) - 4 - phthalimidoacetyl-piperazine.

7. 1 - (2 - pyridyl) - 4 - (β - phthalimidopropionyl) piperazine.

8. 1 - (2 - pyridyl) - 4 - succinimidoacetylpiperazine.

9. A method of preparing compounds having the formula:

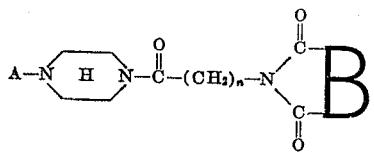

in which A is a member of the group consisting of pyridyl, thiazolyl and pyrimidyl radicals, B is a vicinal bivalent hydrocarbon radical having 2 to 6 carbon atoms, $n$ is a whole integer less than 3, which comprises reacting a compound having the formula:

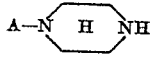

in which A is as defined above with a compound having the formula:

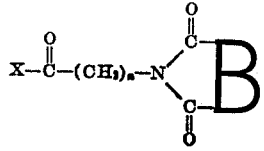

in which B and $n$ are as defined above and X is a halogen radical.

10. A method of preparing compounds having the formula:

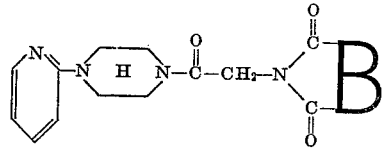

in which B is a vicinal bivalent hydrocarbon radical having 2 to 6 carbon atoms, which comprises reacting a compound having the formula:

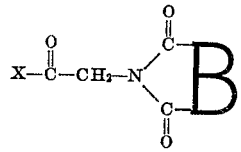

in which B is as defined above and X is a halogen radical, with 1-(2-pyridyl)piperazine.

11. A method according to claim 10 in which B is an ortho-phenylene radical.

12. A method of preparing 1-(2-pyridyl)-4-phthalimidoacetylpiperazine which comprises reacting 1-(2-pyridyl)piperazine with phthalimidoacetyl chloride in a solvent in the presence of an acid-binding agent, and recovering said compound therefrom.

13. A method of preparing 1-(2-thiazoyly)-4-phthalimidoacetylpiperazine which comprises reacting 1-(2-thiazolyl)piperazine with phthalimodoacetyl chloride in a solvent in the presence of an acid-binding agent, and recovering said compound therefrom.

14. A method of preparing 1-(2-pyrimidyl)-4-phthalimidoacetylpiperazine which comprises reacting 1-(2-pyrimidyl)piperazine with phthalimidoacetyl chloride in a solvent in the presence of an acid-binding agent, and recovering said compound therefrom.

15. A method of preparing 1-(2-pyridyl)-4-(β-phthalimidopropionyl)piperazine which comprises reacting 1-(2-pyridyl)piperazine with β-phthalimidopropionyl chloride in a solvent in the presence of an acid-binding agent, and recovering said compound therefrom.

16. A method of preparing 1-(2-pyridyl)-4-succinimidoacetylpiperazine which comprises reacting 1-(2-pyridyl)piperazine with succinimidoacetyl chloride in a solvent, in the presence of an acid-binding agent, and recovering said compound therefrom.

EDWARD A. CONROY.

No references cited.